(12) United States Patent  (10) Patent No.: US 6,543,852 B2
Mori  (45) Date of Patent: Apr. 8, 2003

(54) HEADREST DEVICE

(75) Inventor: Masatoshi Mori, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/891,277

(22) Filed: Jun. 27, 2001

(65) Prior Publication Data
US 2002/0024247 A1 Feb. 28, 2002

(30) Foreign Application Priority Data

Jun. 27, 2000 (JP) ........................................ 2000-193069

(51) Int. Cl.[7] ................................................. A47C 7/38
(52) U.S. Cl. ....................................................... 297/410
(58) Field of Search ......................................... 297/410

(56) References Cited

U.S. PATENT DOCUMENTS

| | | | |
|---|---|---|---|
| 4,765,683 A | * 8/1988 | Hattori | 297/410 |
| 4,923,250 A | * 5/1990 | Hattori | 297/410 |
| 5,026,120 A | * 6/1991 | Takeda et al. | 297/410 X |
| 5,052,754 A | * 10/1991 | Chinomi | 297/410 X |
| 5,222,784 A | * 6/1993 | Hamelin | 297/410 X |
| 5,288,129 A | * 2/1994 | Nemoto | 297/410 |
| 5,433,508 A | * 7/1995 | Akima et al. | 297/410 |
| 5,836,651 A | * 11/1998 | Szerdahelyi et al. | 297/410 |
| 6,062,644 A | * 5/2000 | Lance | 297/410 |
| 6,364,415 B1 | * 4/2002 | Mori et al. | 297/410 |
| 2001/0028191 A1 | * 10/2001 | Lance | 297/410 |

FOREIGN PATENT DOCUMENTS

| | | |
|---|---|---|
| DE | 43 25 996 A1 | 2/1995 |
| DE | 44 07 519 A1 | 9/1995 |
| JP | 5-253034 | 10/1993 |

* cited by examiner

Primary Examiner—Peter R. Brown
Assistant Examiner—Rodney B. White
(74) Attorney, Agent, or Firm—Burns, Doane, Swecker & Mathis, LLP

(57) ABSTRACT

A headrest device includes a thinner and improved positioning of the vertical position adjusting device. A geared or threaded drive shaft and a guide are positioned parallel to each other and parallel relative to a backrest. The driving force is directly transmitted from a motor unit positioned at the upper portion of the drive shaft and the guide to the drive shaft without a gear cable. The motor unit is directly assembled between a pair of longitudinal stay shaft portions at the upper portion of a seat backrest frame without a bracket.

17 Claims, 4 Drawing Sheets

HEADREST DEVICE

This application is based on and claims priority under 35 U.S.C. § 119 with respect to Japanese Application No. 2000-193069 filed on Jun. 27, 2000, the entire content of which is incorporated herein by reference.

FIELD OF THE INVENTION

The present invention generally relates to a headrest. More particularly, the present invention pertains to a vehicle seat headrest which is adjustable to vary the vertical position of the headrest.

BACKGROUND OF THE INVENTION

Japanese Patent Laid-Open Publication No. H05-253034 and German Patent Publication NO. DE4407519C2 disclose known vertically adjustable headrest. These known headrests include a position adjusting device having a motor unit that flexibly adjusts the vertical position of a headrest in accordance with the head position of an occupant. The position adjusting device is accommodated in a seat backrest frame. In Japanese Patent Laid-Open Publication No. H05-253034, the motor unit is disposed on the bottom position in the backrest. In German Patent Publication No. DE4407519C2, the motor unit is positioned at one side of the upper portion in the backrest with a bracket. The motor unit is positioned to provide a rotational drive force via a deceleration gear mechanism to a geared drive shaft. The geared drive shaft is located approximately at the middle portion of the backrest and extends in the vertical direction. In German Patent Publication No. DE4407519C2, a motor and the geared drive shaft are connected with a gear cable. In Japanese Patent Laid-Open Publication No. HC5-253034, the position adjusting device is positioned at the bottom portion of the backrest at a position corresponding to the height of the knees of an occupant in the rear seat. Accordingly, the motor unit positioned at the bottom portion of the backrest enlarges the thickness of the backrest. This restricts the design needs to ensure that the interior space for the occupants is as large as possible. To avoid the aforementioned drawback, German Patent Publication No. DE4407519C2 discloses a system in which the motor unit is provided at the upper portion of the backrest on one side. However, the geared drive shaft for moving the headrest in the vertical direction is positioned at the middle of the backrest. Thus, the motor unit and the geared drive shaft are connected via a gear cable. This increases the number of components and thus the manufacturing cost.

A need thus exists for an adjustable headrest device that does not require the same amount of space in the seat backrest so that the seat backrest can be made thinner than that required for other known devices.

A need also exists for an adjustable headrest device that can be manufactured less expensively than other known devices.

SUMMARY OF THE INVENTION

According to one aspect of the invention, an adjustable headrest device includes a seat backrest including a seat backrest frame, a pair of parallel longitudinal stay shafts projecting upwardly from a top end of the seat backrest, and a position adjusting device disposed in the seat backrest. The position adjusting device includes a motor unit, a vertically extending threaded drive shaft operatively connected to the motor unit, a movable member including a nut portion engaged with the drive shaft to vertically move along the drive shaft and a stopper connecting the movable member with each of the longitudinal stay shafts, and a guide disposed parallel to the drive shaft for guiding vertical movement of the movable member, with the motor unit being positioned between the longitudinal stay shafts at the upper portion of the drive shaft.

According to another aspect of the invention, a headrest device includes an upright seat backrest frame, a headrest frame, a pair of stay shafts extending from the headrest frame, a motor unit mounted on the seat backrest frame at a position between the stay shafts and having a motor and a deceleration gear mechanism, a vertically extending threaded drive shaft having an upper portion directly engaged with the deceleration gear mechanism so that output from the motor transferred to the deceleration gear mechanism is directly transferred to the drive shaft, and a movable member threadably engaged with the drive shaft to move along the drive shaft upon operation of the motor. The movable member is provided with a pair of holes, with each of the stay shafts being positioned and secured in one of the holes of the movable member. A guide is disposed parallel to the drive shaft, with a portion of the movable member engaging the guide during movement of the movable member along the drive shaft.

According to a further aspect of the invention, an adjustable headrest device includes an upright seat backrest frame, a headrest that includes first and second stay shafts, a threaded drive shaft, a motor mounted on the seat backrest frame and operatively engaging an upper end portion of the drive shaft to rotate the drive shaft upon operation of the motor, and a movable member threadably engaged with the drive shaft to move along the drive shaft upon rotation of the drive shaft, with the first stay shaft being fixed in place to a first portion of the movable member and the second stay shaft being fixed in place to a second portion of the movable member. The drive shaft is positioned closer to the first portion of the movable member than to the second portion of the movable member. A guide is secured to the seat backrest frame and is disposed parallel to the drive shaft, with a portion of the movable member engaging the guide during movement of the movable member along the drive shaft.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 8:
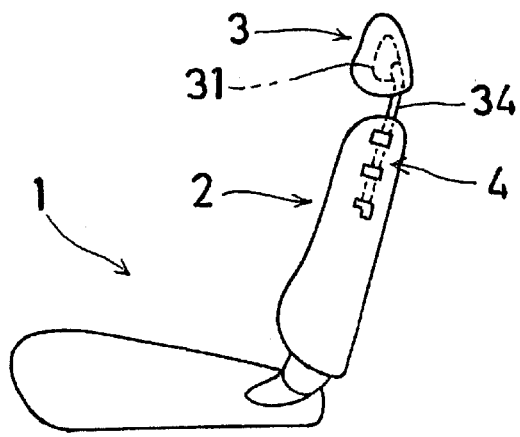
FIG. 8 is a side view of a seat according to the present invention.

Referring initially to FIG. 8, a vehicle seat 1 includes a seat cushion, a backrest 2, a headrest 3 provided at the top end portion of the backrest 2, and a position adjusting device 4 for adjusting the position of the headrest 3 in the vertical direction.

Figure 1:
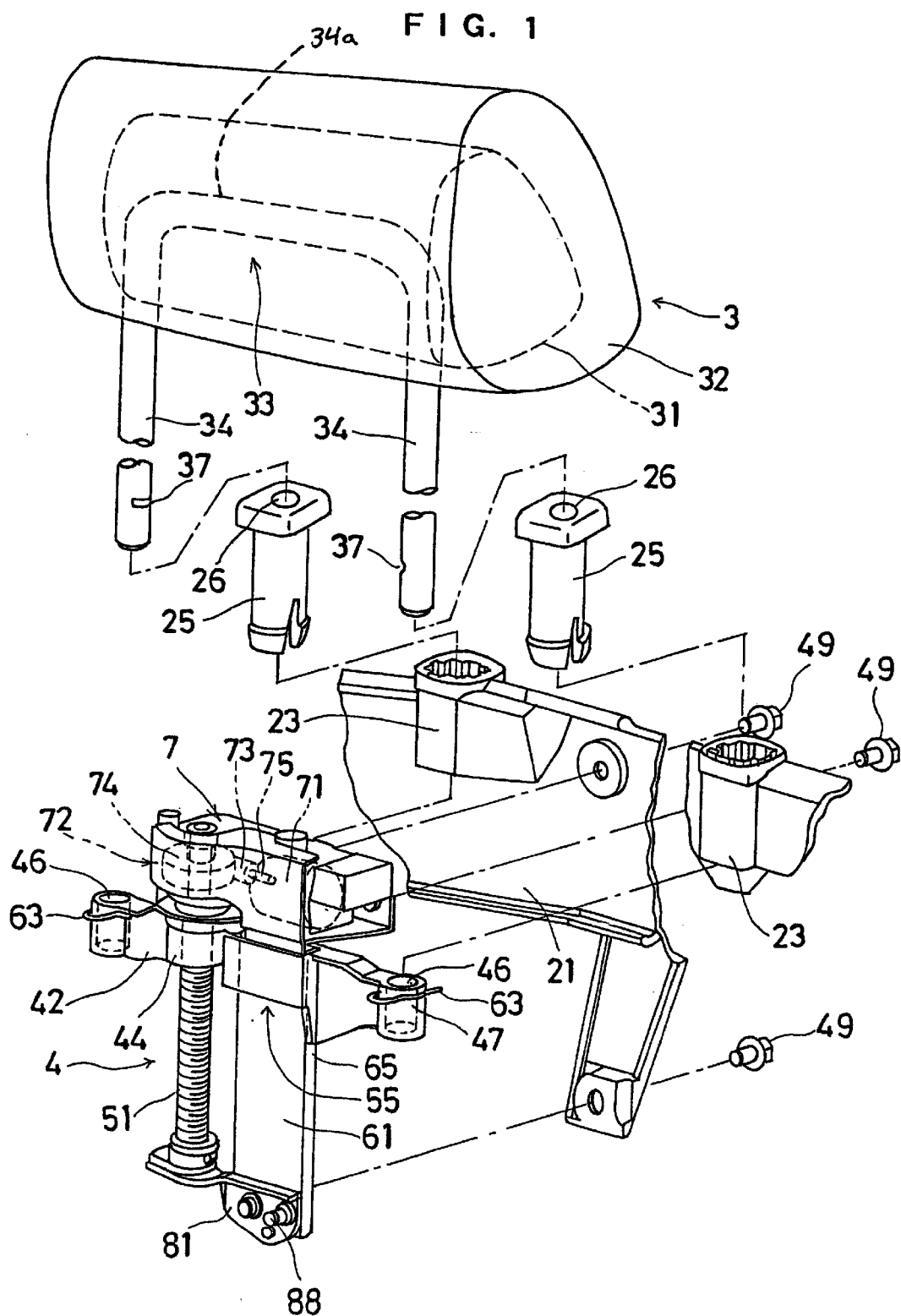
FIG. 1 is a perspective exploded view of a headrest device according to the present invention.

As shown in FIG. 1, the headrest 3 includes a headrest frame 31 that is covered with a cushion member and a headrest covering member 32. The headrest frame 31 is mounted on an upside-down U-shaped headrest stay 33 which can be made from a bar having a round cross-section. The headrest stay 33 includes a pair of longitudinal stay shafts 34 and a lateral stay shaft 34a. The lateral stay shaft 34a is connected to the headrest frame 31 and the pair of longitudinal stay shafts 34 hang down or extend downwardly from the headrest 31.

Referring to FIG. 1, the backrest 2 includes a backrest frame 21. Two stay guide holder portions 23 are provided at the top end portion of the backrest frame 21. The two stay guide holder portions 23 are parallel to one another and are provided with vertically extending bores. A stay guide 25 is positioned in each of the stay guide holder portions 23. Each of the stay guides 25 is provided with a vertically extending penetrating bore 26. Each of the longitudinal stay shafts 34 is slidably positioned in a respective one of the bores 26 of the stay guides 25.

Figure 3:
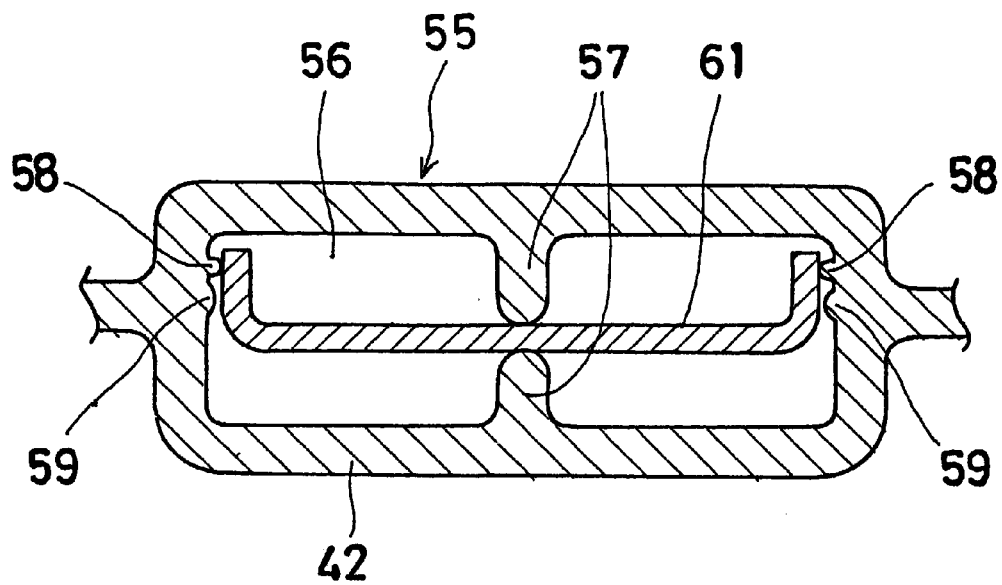
FIG. 3 is a cross-sectional view of a portion of the headrest device taken along the section line III—III of FIG. 2 illustrating the first slidably contacting portion.

The position adjusting device 4 is fixed to the backrest frame 21 by way of a suitable securing mechanism such as a plurality of screw members 49. The position adjusting device 4 includes a geared or threaded drive shaft 51, a guide 61, a movable member 42, and a motor unit 7. The drive shaft 51 extends in the vertical direction of the backrest 2. The guide 61 has a U-shaped cross-section as generally shown in FIG. 3 and extends in the vertical direction generally parallel to the backrest. The movable member 42 extends in the lateral direction of the seat backrest.

Figure 2:
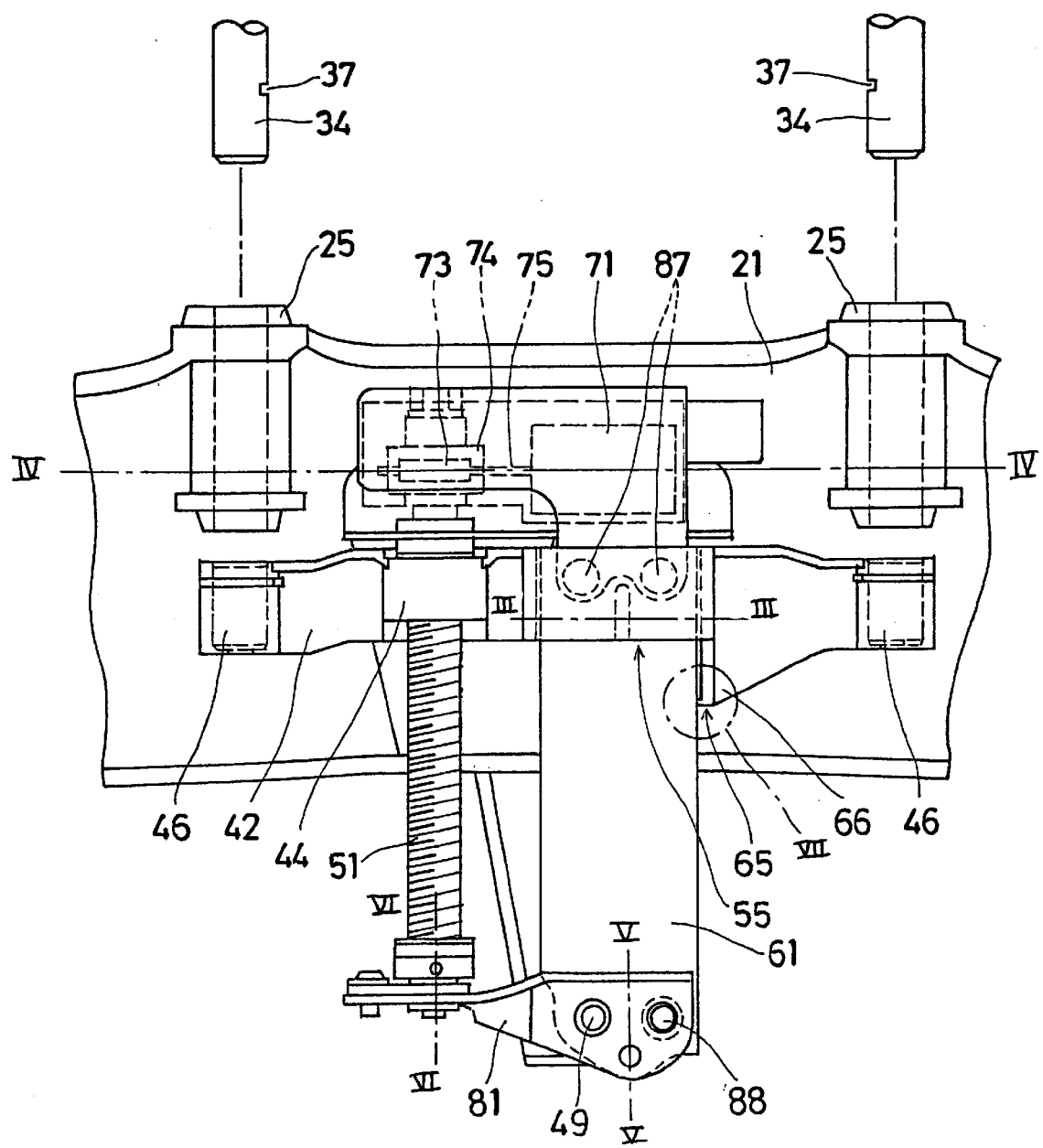
FIG. 2 is a front view of the headrest device according to the present invention.
Figure 4:
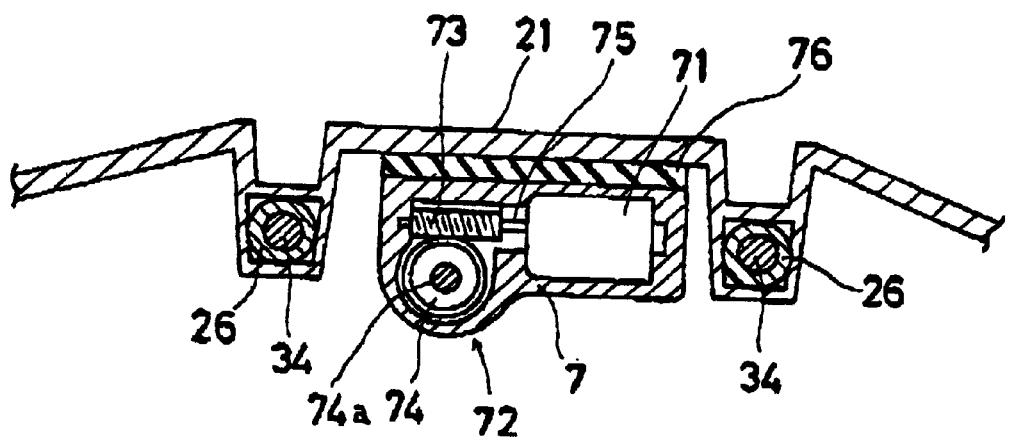
FIG. 4 is a cross-sectional view of a portion of the headrest device taken along the section line IV—IV of FIG. 2 illustrating the motor unit portion.

As shown in FIGS. 1 and 2, the motor unit 7 is positioned at the top end of the drive shaft 51 and the guide 61, and is located between the pair of longitudinal stay shafts 34. As shown in FIG. 4, the motor unit 7 includes a motor 71 having a rotational shaft. The motor 71 is positioned horizontally in the lateral direction of the seat backrest and is located between the longitudinal stay shafts 34. The motor unit 7 further includes a deceleration gear mechanism 72 having a worm gear 73 and a wheel gear 74. The wheel gear 74 includes a rotational shaft 74a. The rotational shaft 74a and the drive shaft 51 are directly connected to one another so that the rotational driving force of the motor is directly transmitted to the drive shaft 51 without the need for a gear cable.

The motor unit 7 is directly connected to the top portion of the seat backrest frame 21, which also functions as a reinforcement member, by way of several screw members 49, without using other members such as an attaching bracket. In addition, the motor unit 7 is connected to the top portion of the seat backrest frame 21 via an elastic seat 76 which mitigates or reduces the transmission of operational noise of the motor 71 between the seat backrest frame 21 and the motor unit 7. As noted above, the motor unit 7, including the motor 71, is positioned between the pair of longitudinal stay shafts 34. The output shaft 75 for outputting the rotation of the motor 71 is at one end portion of one side of the motor 71. Thus, the drive shaft 51 is spaced from the middle position of the pair of longitudinal stay shafts 34 (i.e., the drive shaft 51 is located closer to one of the stay shafts 34 than the other as shown in FIG. 2).

As shown in FIG. 1 and 2, the movable member 42 includes a nut portion 44 that engages the threaded drive shaft 51 and two lugs each provided with a through bore 46 that opens at both the top and bottom sides. The lugs and associated through bores 46 are located on the left and right ends of the movable member 42. The inner diameter of each bore 46 is sized to receive a respective one of the stay shaft portions 34 with a slight clearance between the inner surface of the through bores 46 and the outer surface of the stay shaft portions 34.

When the bottom end of each longitudinal stay shaft 34 is inserted into the respective bore 46 from the top of the bore 46, the longitudinal stay shafts 34 are stopped or held at a particular position relative to the movable member 42. The longitudinal stay shafts 34 are fixed at such position by virtue of a stopping groove 37 formed on one end portion of each stay shaft 34, a partially horizontally extending pin groove 47 formed on the outer diameter portion of each lug forming the bores 46, and respective generally U-shaped pin 63 that engages the pin grooves. Each of the longitudinal stay shafts 34 is thus fixed to a respective portion of the movable member 42 so that movement of the movable member 42 causes movement of the longitudinal stay shafts 34 and thus the headrest 3.

The movable member 42 includes a first slidably contacting portions 55 and a second slidably contacting portion 65 that slidably contact the guide 61 which is positioned parallel to the drive shaft 51. As shown FIG. 3, the first slidably contacting portion 55 includes a first pair of oppositely positioned projections 57, 57, a second pair of oppositely positioned projections 58, 58 and a third pair of oppositely positioned projections 59, all of which are formed on and extend inwardly from the inner wall of a bore 56 (i.e., the rectangular-shaped bore) of the movable member 42 that encloses the guide 61. The first and second pairs of projections 57, 57, 58, 58 are oriented parallel to one another. Further, the pair of third projections 59 is oriented transverse (e.g., perpendicular) to the first and second pairs of projections 57, 57, 58, 58.

The first pair of projections 57, 57 is positioned to hold the middle of the U-shaped portion of the guide 61 from the front and the rear sides. The second and third pairs of projections 58, 58, 59, 59 are positioned to hold the sides (i.e., the right and left sides as seen in FIG. 3) of the guide 61 from the outer side surface. Each projection of the second and third pairs of projections 58, 58, 59, 59 provided on the right and left sides is adapted to slidably contact the guide 61. The second projections 58, 58 are thinner, but have a greater axial extent or length, than the third projections 59, 59. That is, the size in the width direction of the guide 61 held by the respective ends of the pair of the second projections 58, 58 is narrower and the size in the width direction of the guide 61 held by respective ends of the pair of third projections 59, 59 is wider. Thus, the distance between the ends of the second projections 58, 58 is less than the distance between the ends of the third projections 59, 59.

The distance in the width direction between the second pair of projections 58, 58 is adapted to appropriately slidably contact the guide 61 when the manufactured size of the guide 61 is at a median value (i.e., a middle value of the design drawing tolerance). The distance in the width direction between the third pair of projections 59, 59 is adapted to appropriately slidably contact the guide 61 when the manufactured size of the guide 61 is larger than the median value. That is, when the manufactured size of the guide 61 is larger than the median value, the guide 61 is relatively strongly squeezed between the second projections 58, 58 and so a relatively large amount of friction is generated. In such a case, through trial operation of the position adjusting device (i.e., an accelerated wearing process for the projections), the tips of the second projections 58, 58 tend to wear out. When this occurs, the third projections 59, 59 are available to contact the guide 61 and provide a larger contact along with the second projections 58, 58. When the manufactured size of the guide 61 is smaller than the median value, the second projections 58, 58 can provide adequate guidance substantially without wearing out during the trial operation.

Figure 7:
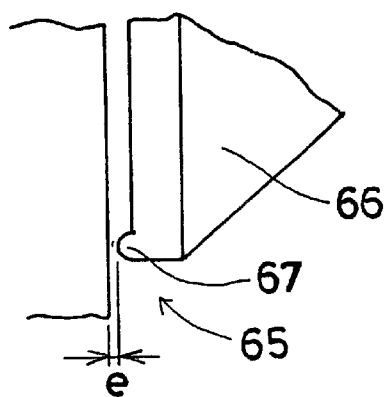
FIG. 7 is a magnified view of the portion of the headrest device identified by VII in FIG. 2 illustrating the second slidably contacting portion.

As shown in FIG. 7, which is an enlarged view of the circled portion of the device shown in FIG. 2, the second slidably contacting portion 65 is positioned on the movable member 42 at the side opposite the side at which is located the nut portion 44 so that the rectangular bore 56 is located between the nut portion 44 and the second slidably contacting portion 65. The second slidably contacting portion 65 is formed with a downwardly extending arm portion 66 provided with a projection (fourth projection) 67 which is positioned vertically below or elevationally lower than the first slidably contacting portion 55 and is directed towards the side face of the guide 61. The fourth projection 67 normally maintains a small gap (e) relative to the guide 61 and functions as a sliding point only when a load affects or acts on the movable member 42 in the direction which closes this gap (e).

Figure 5:
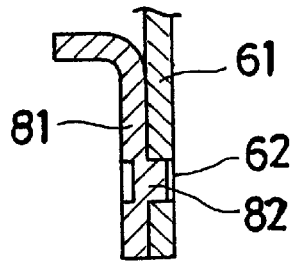
FIG. 5 is a cross-sectional view of a portion of the headrest device taken along the section line V—V of FIG. 2 illustrating the position determining projection.
Figure 6:
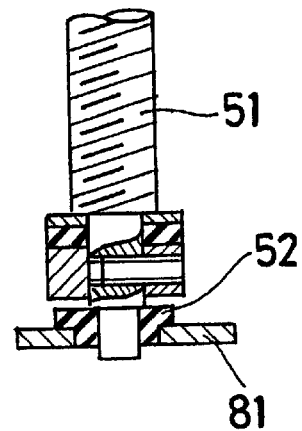
FIG. 6 is a cross-sectional view of a portion of the headrest device taken along the section line VI—VI of FIG. 2 illustrating the geared drive shaft supporting portion.

As shown in FIGS. 2 and 6, a bracket 81 is secured to the bottom of the guide 61 and a bearing 52 is provided on the bracket 81 to rotatably support the bottom end of the threaded drive shaft 51. As shown in FIG. 5, a position determining bore or hole 62 is formed in the guide 61 and the bracket 81 is provided with a position determining projection 82. The position determining projection 82 is adapted to be fitted into the position determining bore 62.

The motor unit 7 and the guide 61 are fixed with screws 87 as shown in FIG. 2. The guide 61 and the bracket 81 are fixed together with a screw 88 once the engagement between the position determining bore 62 and the position determining projection 82 is effected.

Due to the tight engagement of the guide 61 and the bracket 81, and the position determining bore 62 and the position determining projection 82, the operation of the drive shaft 51 can be confirmed even when the position adjusting device 4 is not assembled in the backrest frame 31, that is when the position adjusting device 4 is in the form of a subassembly. To help ensure that the position adjusting device smoothly operates when mounted on the seat, the trial operation of the position adjusting device mentioned above is performed to achieve relatively smooth sliding engagement and minimized gap between the guide 61 and the first slidably contacting portion. As mentioned above, during this operation, because the width (distance) between the tip portions of the pair of projections 58, 58 is defined narrower in the first slidably contacting portion 55 of the movable member 42 that contacts the guide 61, excessive friction resistance may be generated relative to the guide 61. In this case, by wearing out the tip portions of the projections 58 through the trial operation of the position adjusting device alone, the position adjusting device is adjusted to achieve smooth operation without excessive looseness.

The assembly and operation of the headrest device in this embodiment of the present invention is as follows. After being adjusted for operating without generating excessive friction by the position adjusting device 4 alone, the position adjusting device 4 is assembled to the backrest frame 2. Once the cushion member and the headrest covering member 32 are assembled to the seat 1, the stay shafts 34 are inserted from above into respective bores 26 of the stay guides 25 provided on the upper portion of the backrest 2. The stay shafts 34 extend into the bores 46 which are aligned with the respective bores 26 in the stay guides 25. The position of the stay shafts 34 relative to the movable member 42 is then fixed by the pins 63 that engage the respective grooves 47 provided at the bores 46 of the movable member 42 and the respective grooves 37 on the stay shafts 34. The headrest 3 is thus assembled. In the assembled state, the longitudinal stay shafts 34 extend upwardly from the top of the seat backrest 2.

During the assembling process, a relatively large load may be applied to the movable member 42 via the headrest 3. In this case, the gap (e) between the projection 67 of the second slidably contacting portion 65 and the guide 61 is closed so that the load is received by the guide 61 via the arm portion 66 and the projection 67. Thus, potential damage of the members such as the movable member 42 is inhibited or substantially prevented.

During actual use, the foregoing structure (i.e., the interaction or engagement of the projection 67 and the side of the guide 61) functions to inhibit or substantially prevent damage to the position adjusting device 4 in the event an excessive load (a load greater than a predetermined load) is applied, such as if a child or other individual hangs from the headrest or otherwise applies a force to the headrest. Because the drive shaft 51 and the guide 61 are positioned parallel to each other and relative to the backrest 2, the thickness in front-rear direction of the backrest 2 can be reduced.

Also, because the drive shaft 51 is located at a position spaced from the middle of the pair of longitudinal stay shafts 34 (i.e., the drive shaft 51 is located closer to one of the longitudinal stay shafts 34 than the other), the headrest device may have a tendency to be affected by influences such as distortion that may occur when a load is applied to only one side of the headrest 3. As a countermeasure for such load, sufficient strength can be achieved through compensation by absorbing the load at the second slidably contacting portion 65.

The position adjusting operation of the headrest 3 by the occupant is as follows. When a switch of the position adjusting device 4 is turned on, the motor 71 is operated to rotate the drive shaft 51. The rotation of the nut portions 44 is prevented by the first slidably contacting portion 55 positioned between the guide 61 and the movable member 42 and so the movable member 42 moves upwardly or downwardly depending upon the direction of rotation of the drive shaft 51. The optimum or desired position of the headrest 3 is achieved by continuing to press the switch until the movable member 42 reaches the desired or necessary position.

The positioning of the motor 71 at the upper middle portion of the backrest frame 21 means that the motor 71 is positioned closer to the ears of the occupant as compared to known headrest devices. However, the transmission of operational noise that might otherwise be unpleasant to the occupant is mitigated by the elastic seat 76 which serves as an anti-vibration mechanism.

With the headrest device of the present invention in which the position adjusting device is positioned in the vertical direction, the size of the backrest 2 in the front-rear direction can be made thinner by positioning the motor unit 7 in the upper portion of the backrest frame 21. Also, the upper portions of the drive shaft 51 and the guide 61 are positioned between the pair of longitudinal stay shafts 34. With the foregoing structure, particularly the thickness of the bottom portion of the backrest 2 can be reduced, thus making it possible to provide a larger space for occupants in the rear seat. Further, by operatively connecting the motor 7 and the drive shaft 51 without a gear cable to directly transmit the driving force to the drive shaft 51, the manufacturing cost associated with the headrest device can be advantageously reduced.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An adjustable headrest device comprising:
   a seat backrest including a seat backrest frame;
   a pair of parallel longitudinal stay shafts projecting upwardly from a top end of the seat backrest; and
   a position adjusting device disposed in the seat backrest, the position adjusting device comprising:
      a motor unit;
      a vertically extending threaded drive shaft operatively connected to the motor unit;
      a movable member including a nut portion engaged with the drive shaft to vertically move along the drive shaft and a stopper connecting the movable member with each of the longitudinal stay shafts;
      a guide disposed parallel to the drive shaft for guiding vertical movement of the movable member;
      an elastic seat positioned between the motor unit and the seat backrest frame; and
      the motor unit being positioned between the longitudinal stay shafts at an upper portion of the drive shaft.

2. The headrest device according to claim 1, wherein the movable member includes a slidably contacting portion which contacts the guide upon application of a load greater than a predetermined value.

3. The headrest device according to claim 1, including a bracket rotatably supporting a portion of the drive shaft, the bracket being secured to the guide.

4. The headrest device according to claim 3, wherein one of the bracket and the guide includes a position determining projection and the other of the bracket and the guide includes a position determining bore, the position determining projection engaging the position determining bore.

5. An adjustable headrest device comprising:
   an upright seat backrest frame;
   a headrest frame;
   a pair of parallel stay shafts extending from the headrest frame;
   a motor unit mounted on the seat backrest frame at a position between the stay shafts, the motor unit including a motor and a deceleration gear mechanism;
   a vertically extending threaded drive shaft having an upper portion directly engaged with the deceleration gear mechanism so that output from the motor transferred to the deceleration gear mechanism is directly transferred to the drive shaft;
   a movable member threadably engaged with the drive shaft to move along the drive shaft upon operation of the motor, the movable member including a pair of holes, each of the stay shafts being positioned and secured in one of the holes of the movable member;
   a guide disposed parallel to the drive shaft, with a portion of the movable member engaging the guide during movement of the movable member along the drive shaft; and
   wherein the movable member includes a projection extending towards the guide, the projection contacting a side of the guide upon application of a load greater than a predetermined value to the headrest frame and spaced from the side of the guide absent application of a load greater than the predetermined value to the headrest frame.

6. The headrest device according to claim 5, including a bracket rotatably supporting a portion of the drive shaft, the bracket being secured to the guide.

7. The headrest device according to claim 6, wherein one of the bracket and the guide includes a position determining projection and the other of the bracket and the guide includes a position determining bore, the position determining projection engaging the position determining bore.

8. The headrest device according to claim 5, including an elastic seat positioned between the motor unit and the seat backrest frame.

9. The headrest device according to claim 5, wherein the movable member includes a portion encircling a portion of the guide, the portion of the movable member encircling the portion of the guide being provided with a pair of first projections extending towards one another.

10. The headrest device according to claim 9, wherein the portion of the movable member encircling the portion of the guide is provided with a pair of second projections extending towards one another.

11. The headrest device according to claim 10, wherein the portion of the movable member encircling the portion of the guide is provided with a pair of third projections extending towards one another.

12. An adjustable headrest device comprising:
   an upright seat backrest frame;
   a headrest that includes first and second stay shafts;
   a threaded drive shaft;
   a motor mounted on the seat backrest frame and operatively engaging an upper end portion of the drive shaft to rotate the drive shaft upon operation of the motor;
   a movable member threadably engaged with the drive shaft to move along the drive shaft upon rotation of the drive shaft, the first stay shaft being fixed in place relative to the movable member and the second stay shaft being fixed in place relative to the movable member, the drive shaft being positioned closer to the first stay shaft than the second stay shaft;
   a guide secured to the seat backrest frame and disposed parallel to the drive shaft, with a portion of the movable member engaging the guide during movement of the movable member along the drive shaft; and a bracket rotatably supporting a portion of the drive shaft, the bracket being secured to the guide, one of the bracket and the guide including a position determining projection and the other of the bracket and the guide including a position determining bore, the position determining projection engaging the position determining bore.

13. The headrest device according to claim 12, wherein the movable member includes a projection extending towards the guide, the projection contacting a side of the guide upon application of a load greater than a predetermined value to the headrest frame and spaced from the side of the guide absent application of a load greater than the predetermined value to the headrest frame.

14. The headrest device according to claim 12, including an elastic seat positioned between the motor unit and the seat backrest frame.

15. The headrest device according to claim 12, wherein the guide is positioned between the drive shaft and a portion of the movable member on which the second stay shaft is fixed.

16. The headrest device according to claim 12, wherein the movable member includes an encircling portion that encircles a portion of the guide, the encircling portion of the movable member being provided with a pair of first projections extending towards one another and a pair of second projections extending towards one another, the pair of first projections being oriented transverse to the pair of second projections.

17. The headrest device according to claim 16, wherein the encircling portion of the movable member is provided with a pair of third projections oriented parallel to the pair of first projections.

* * * * *